Jan. 30, 1923.

W. R. SAVAGE.
PNEUMATIC TIRE.
FILED OCT. 12, 1918.

1,443,652

Witness:
A. W. Jamieson.

Inventor.
WILL R. SAVAGE,
By David O. Barnell,
Attorney.

Patented Jan. 30, 1923.

1,443,652

UNITED STATES PATENT OFFICE.

WILL R. SAVAGE, OF OMAHA, NEBRASKA.

PNEUMATIC TIRE.

Application filed October 12, 1918. Serial No. 259,127.

*To all whom it may concern:*

Be it known that I, WILL R. SAVAGE, a citizen of the United States, and a resident of Omaha, in the county of Douglas and State of Nebraska, have invented certain new and useful Improvements in Pneumatic Tires, of which the following is a specification.

My invention relates to resilient tires, and it is the object thereof to provide a pneumatic or inflatable single-tube tire adapted for use on motor-vehicles, and applicable to the common and standard types of wheel-rims now in general use on vehicles of this kind. Single-tube pneumatic tires have been very successfully used for light service, as on bicycles, and have entirely superseded double-tube tires for such use. Heretofore, single-tube pneumatic tires have not been employed for motor-vehicles or other heavy-duty uses, owing to the difficulties experienced in preventing relative movement of the tire and rim, which results in injury to the filling-tube through which compressed air is supplied to the tire. For bicycles, the relatively light service required of the tires permits the same to be satisfactorily held upon the wheel-rims by cementing the tires thereto, but, owing to the more severe stresses to which motor-vehicle tires are subjected, cementing cannot be effectually employed therewith as a means for holding the tires upon the rims. One of the advantages of single-tube tires, besides the greater simplicity and ease of application thereof, is that there may be used with such tires fluid puncture-healing compounds, introduced through the filling-tube and carried in the air-space thereof, such compounds being capable of automatically closing and sealing ordinary punctures and preventing escape of air from the tire, whereby the most serious annoyance and difficulty attending the use of pneumatic tires is almost entirely obviated. With double-tube tires it is impracticable to use such puncture-healing compounds for the reason that upon puncture of the inner tube the escaping sealing fluid can flow between the inner tube and the outer tube or casing, so as to cement them together and prevent subsequent separation thereof. My invention provides a single-tube tire so constructed and arranged that it may be retained fixedly upon rims of ordinary form, under the heavy-duty conditions imposed upon tires for motor-vehicles.

Figure 1:
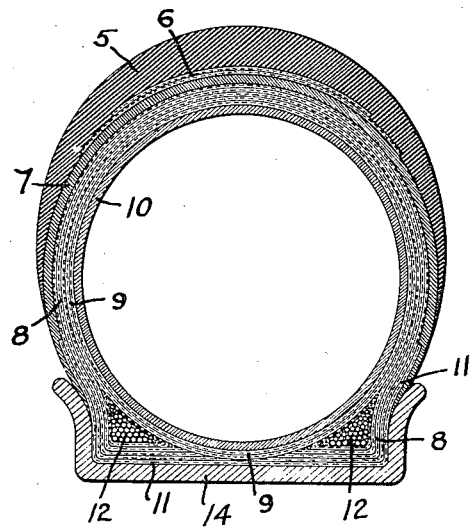
Figure 2:
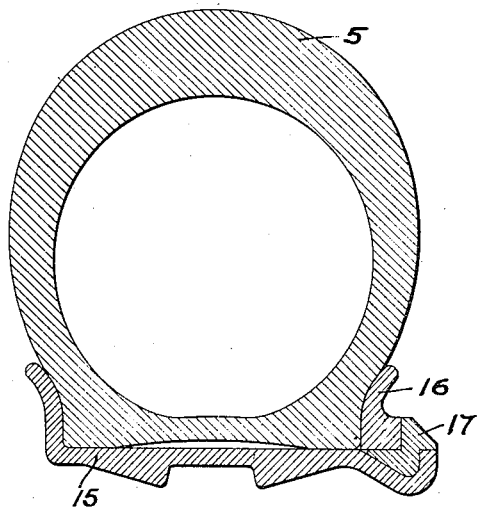
Figure 3:
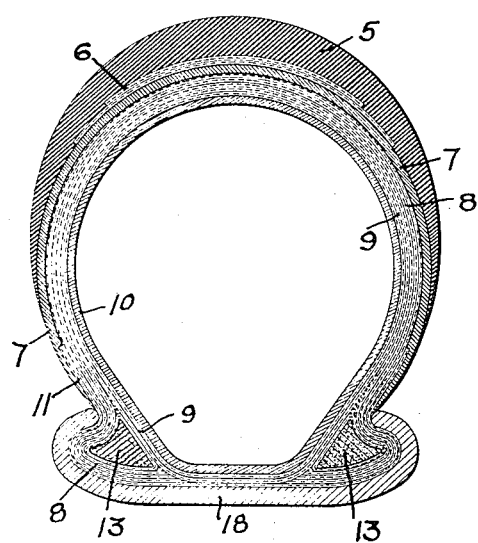
Figure 4:
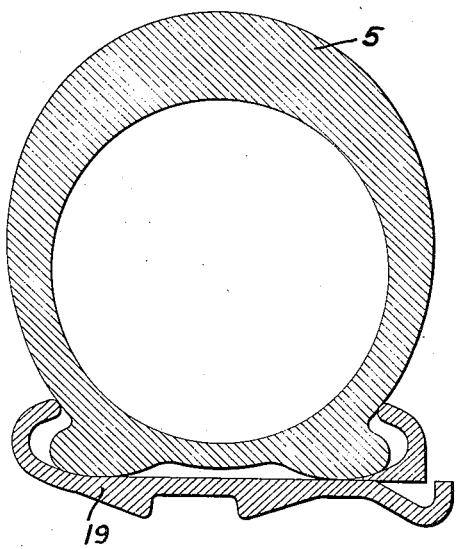

In the accompanying drawings Fig. 1 is a transverse sectional view of a straight-side tire embodying my invention, Fig. 2 is a diagrammatic view of the same tire, showing the uninflated form thereof, also showing a different type of rim, Fig. 3 is a transverse sectional view of a tire of the clincher type embodying my invention, and Fig. 4 is a diagrammatic sectional view of the same tire, showing the uninflated form thereof, and also showing in connection therewith a rim having a removable side-flange, and Fig. 5 is a detail view showing the metallic bead cores in the form of the invention shown in Figures 3 and 4.

The tread portions of tires constructed in accordance with my invention may be, and are preferably, substantially the same as the corresponding portions of the outer part or casing of the double-tube tires now commonly used on motor-vehicles. Thus, as shown in Figs. 1 and 3, I provide a heavy wearing-tread 5 of tough rubber, which may be either smooth-surfaced, as shown, or any other suitable construction may be employed as will be readily understood. The tread 5 is thickest at the center, and at each side of the tire-body is thinned or tapered so as to terminate on the inner portions of the tire surface. Within or beneath the central part of the tread 5 there are breaker strips 6 of fabric, said strips overlying a layer 7 of pure soft rubber or cushion-stock, which extends around the sides of the tire-body and terminates immediately adjoining the beads. Underlying the cushion-strip 7 is the main fabric carcass, comprising a plurality of layers 8 and 9, of rubber-impregnated fabric with interstitial thin layers of rubber, binding and connecting the same together. Within the fabric carcass, and permanently vulcanized thereto, is a continuous tube 10 of soft elastic rubber which surrounds the air-space. One or more of the inner layers or plies 9 of the fabric carcass surround the tube 10 uninterruptedly, but the outer plies 8 of the carcass are extended externally of the bead-cores, which are thus enclosed between the outer plies 8 and the inner plies 9. After passing around the bead-cores, the ends or marginal edges of the plies 8 abut the plies 9 along lines equally spaced laterally from the median line of the base or rim-side of the tire-body. A reinforcing strip 11 extends across the base, around the beads, and terminates on the inner portions of the tire-body, inside the edge-portions of the cushion-strip 7. In the straight-side form of the tire, shown in Fig. 1, the bead-cores 12 are formed principally of wires which are bedded in rubber and form substantially inelastic rings of fixed diameter, which establish and maintain a definite diameter of the base or rim-engaging portion of the tire. In the clincher form of the tire, shown in Fig. 3, the bead-cores 13 are of the usual non-metallic material, being only sufficiently elastic to enable enough enlargement of their diameter to permit forcing them over the rim-flanges, when mounting the tire on or demounting the same from a solid clincher-rim. Metallic inelastic bead-cores may be used for the clincher-type tire when the same is to be mounted on a rim having a removable flange, such as that shown in Fig. 4.

The rim 14, shown in Fig. 1, will be understood to be of the type having integral side-flanges, but having its circular continuity interrupted at one point, whereby one of its ends may be sprung inwardly and the other overlapped thereon to reduce the effective diameter of the rim and enable mounting and demounting of the tire. The rim 15, shown in Fig. 2, has one side-flange integral with its body, while the other flange 16 is removable and is normally retained in position by a lock-ring 17. The rim 18, shown in Fig. 3, is the ordinary continuous clincher-rim, over the flanges of which, as before mentioned, it is necessary that the tire-beads be stretched in mounting and demounting the tire. The rim 19, shown in Fig. 4, is similar to that shown in Fig. 2, except that the flanges are formed to receive clincher beads.

Each form of the tire is characterized by having the base, or portion thereof intermediate and including the beads, slightly wider than the space between the flanges of the rim on which the tire is mounted, whereby when the tire is inflated the beads are pressed out laterally against the rim-flanges, so as to be firmly gripped thereby. To permit ready assembling of the uninflated tire upon the rim, the portion intermediate the beads is so formed as to tend to bow outwardly from the rim, or into the air-space of the tire, as shown in Figs. 2 and 4, whereby the effective or unextended width of the base is such that it will readily enter the space between the rim-flanges, prior to the extension or straightening of the bowed portion by the inflation of the tire. In each form of the tire, also, the same is caused to grip the main body of the rim by pressing inwardly thereagainst, when under inflation, in addition to the lateral gripping pressure against the rim-flanges. It will be noted that in each instance the beads are maintained at a fixed diameter, this being attained by the metallic bead-cores in the case of the straight-side tire, and by the inturned portions of the rim-flanges in the case of the clincher type of the tire. Thus the internal air-pressure exerted upon the relatively thin and slightly elastic base-portion of the tire-body between the beads, can only result in pressing said intermediate portion inward, radially of the tire as a whole, and against the body of the rim.

In that form of the tire shown in Fig. 1, the transverse section of the air-space is circular when the tire is inflated, said space being indented at the base when the tire is not inflated, as shown in Fig. 2. In the other illustrated form of the tire, the air-space is circular in transverse section, as shown in Fig. 4, when the tire is not inflated, and assumes the approximate pear-shape shown in Fig. 3 when the base is flattened and expanded laterally by the air-pressure during inflation. In the latter form of the tire, the flattening of the base, and the accompanying lateral movement of the beads, results in a slight rotation of the beads about the axes of the bead-cores.

It will be obvious that tires embodying my invention may be constructed with cord instead of fabric reinforcing material in the body thereof, and that the tires may be applied to rims of any of the common and standard forms now in use on motor vehicles. It will also be apparent that when the tires are inflated they will be securely retained upon the rim, the latter being gripped by both the lateral pressure upon its flanges and the radial inward pressure upon the body of the rim, the effect being substantially the same as that attained with the ordinary double-tube tires. Thus it will be seen that I attain all of the advantages of single-tube pneumatic tires, including adaptability for use with puncture-healing compounds, and the avoidance of chafing, wrinkling and pinching of the air-containing tube, without being dependent upon cementing or other ineffective means for holding the tires upon the wheel-rims.

Now, having described my invention, what I claim and desire to secure by Letters Patent is:

1. A single tube pneumatic tire having a rim engaging base adapted to fit upon a wheel rim between the marginal flanges thereof, said tire being provided at the sides of the base with beads of a fixed diameter for engaging the rim flanges and having a portion intermediate of and connecting the said beads and of less thickness and greater elasticity than the body portion of the tire, said intermediate connecting portion being laterally extensible by the inflation of the tire to permit the beads to be pressed laterally outward against the rim flanges, the said intermediate portion being simultaneously pressed radially inward to fit against the cylindrical portion of the rim, the said intermediate connecting portion being expansible so as to permit the base of the tire to expand to a width slightly greater than the space between the rim flanges to produce an increased pressure of the beads against the said rim flanges and the said intermediate portion lying flat against the rim without buckling the material when the tire is inflated.

2. A single tube pneumatic tire having a rim engaging base adapted to fit upon a wheel rim between the marginal flanges thereof, said tire being provided at the sides of the base with beads and having a relatively pliable portion intermediate of and connecting the beads and being of a thickness less than the body portion of the tire form, and said intermediate connecting portion being arched when the tire is deflated and spaced from the rim and extensible to a width slightly greater than the space between the rim flanges, whereby when the tire is inflated, the beads will be pressed laterally against the rim flanges with increased pressure and the intermediate connecting portion will be pressed inwardly radially of the wheel against the rim.

3. A single tube pneumatic tire having a rim engaging base adapted to fit upon a wheel rim between the marginal flanges thereof, said tire being provided at the sides of the base with beads, said tire comprising an outer tread portion, an inner tube of soft elastic rubber, and intermediate layers of rubber impregnated material, a portion of the inner intermediate layers extending entirely around the inner tube and inside of the beads and the remainder of the said layers extending around the outside of the beads and abutting the inner layers along lines spaced from the median line of the base of the tire body, thereby forming a portion between the beads of less thickness and greater elasticity than the body portion of the tire and which will upon inflation of the tire extend and allow the beads to be pressed laterally against the rim flanges with increased pressure.

4. A single tube pneumatic tire having a rim engaging base adapted to fit upon a wheel rim between the marginal flanges thereof, said tire being provided at the sides of the base with beads, said tire comprising an outer tread portion, an inner tube of soft elastic rubber, intermediate layers of rubber impregnated material, a portion of the inner intermediate layers extending entirely around the inner tube and inside of the beads and the remainder of the said layers extending around the outside of the beads and abutting the inner layers along lines spaced from the median line of the base of the tire body thereby forming a portion between the beads of less thickness and greater elasticity than the body portion of the tire and which will upon inflation of the tire extend and allow the beads to be pressed laterally against the rim flanges with increased pressure, and a reinforcing member extending along the bottom of the base and up the sides to a point above the top of the beads.

WILL R. SAVAGE.